US005893136A

United States Patent [19]
Stolt et al.

[11] Patent Number: 5,893,136
[45] Date of Patent: *Apr. 6, 1999

[54] MEMORY CONTROLLER FOR INDEPENDENTLY SUPPORTING SYNCHRONOUS AND ASYNCHRONOUS DRAM MEMORIES

[75] Inventors: Patrick F. Stolt, Beaverton; Thomas J. Holman, Portland, both of Oreg.

[73] Assignee: Intel Corporation, Santa Clara, Calif.

[ * ] Notice: The term of this patent shall not extend beyond the expiration date of Pat. No. 5,721,860.

[21] Appl. No.: 956,693

[22] Filed: Oct. 24, 1997

Related U.S. Application Data

[63] Continuation of Ser. No. 767,853, Dec. 17, 1996, Pat. No. 5,721,860, which is a continuation of Ser. No. 248,301, May 24, 1994, abandoned.

[51] Int. Cl.⁶ ............................. G06F 12/00; G06F 13/00
[52] U.S. Cl. ......................... 711/105; 711/100; 711/154; 711/167; 365/230.02; 365/233
[58] Field of Search ...................... 711/100, 105, 711/154, 167, 170, 111; 365/230.01, 230.02, 233

[56] References Cited

U.S. PATENT DOCUMENTS

| | | | |
|---|---|---|---|
| 4,908,789 | 3/1990 | Blokkum et al. | 711/172 |
| 5,040,153 | 4/1991 | Fung et al. | 365/230.03 |
| 5,175,835 | 12/1992 | Beighe et al. | 395/733 |
| 5,237,672 | 8/1993 | Ing-Simmons et al. | 711/211 |
| 5,269,010 | 12/1993 | MacDonald | 711/5 |
| 5,276,843 | 1/1994 | Tillinghast et al. | 711/105 |
| 5,301,278 | 4/1994 | Bowater et al. | 711/5 |
| 5,307,320 | 4/1994 | Farrer et al. | 711/105 |
| 5,317,709 | 5/1994 | Sugimoto | 711/105 |
| 5,343,404 | 8/1994 | Girgis | 364/484 |
| 5,533,194 | 7/1996 | Albin et al. | 395/183.18 |
| 5,651,130 | 7/1997 | Hinkle et al. | 711/105 |
| 5,680,570 | 10/1997 | Rantala et al. | 711/105 |
| 5,684,978 | 11/1997 | Sarma et al. | 711/106 |

OTHER PUBLICATIONS

"Configurations for Solid State Memories," JEDEC Standard No. 21–C, Release 6, Jan. 1996, Electronic Industries Association Engineering Department.

(List continued on next page.)

*Primary Examiner*—Tod R. Swann
*Assistant Examiner*—Tuan V. Thai
*Attorney, Agent, or Firm*—Blakely, Sokoloff, Taylor & Zafman LLP

[57] ABSTRACT

The present invention provides a method and apparatus in a memory controller coupled between a system bus and memory for independently supporting one of a Synchronous DRAM (SDRAM) and an Asynchronous DRAM (ADRAM) memory type via common signal pins. According to the preferred embodiment, the memory controller comprises memory control logic for generating both SDRAM and ADRAM memory interface signals and multiplexing means for selecting as output onto common signal pins either set of interface signals depending upon a memory type setting programmed within a configuration register. The memory control logic comprises at least a request processor in addition to two memory state machines, one for SDRAM and the other for ADRAM memory operations. When a system bus request is received by the request processor, it is assigned to a request state machine which interacts with both the SDRAM state machine and the ADRAM state machine to generate two sets of memory interface signals in addition to two sets of internal control signals. The sets of signals are input to a multiplexor provided for each type of control signals (i.e., memory interface and internal control), which multiplexors are controlled by the memory type select signal output from the configuration register. Based on the memory type setting programmed into the configuration registers, the appropriate sets of memory interface and internal control signals (i.e., either SDRAM or ADRAM) are selected for output to the memory array and to other units of the memory controller, respectively.

26 Claims, 6 Drawing Sheets

OTHER PUBLICATIONS

"16Mbit Synchronous DRAM," NEC Corporation, Mar. 31, 1994.

"Single Chip PCI Bridge and Memory Controller for PowerPC™ Microprocessors," Michael J. Garcia, Brian K. Reynolds, Motorola Inc., 1993 IEEE, pp. 409–412.

"A New Era of Fast Dynamic RAMs," Fred Jones, United Memories, Inc., IEEE Spectrum Oct. 1992, pp. 43–45 and 48–49.

"16–Mb Sychronous DRAM with 125/MByte/s Data Rate," Yunho Choi, Myungho Kim, et al., IEEE Journal of Solid–State Circuits, vol. 29, No. 4, Apr. 1994, pp. 529–533.

"The Metaflow Architecture", Popescu, et al., IEEE Micro, 1991, pp. 10–13 and 63–73.

"Bottlenecks the Hot Topic at IC Confab," Ron Wilson, EE Times, Issue 811, Aug. 22, 1994, pp. 1 and 84.

FIG_1

FIG_2

FIG_3

FIG_4A

FIG_4B

FIG_4C

FIG_4D

FIG_5A

FIG_5B

FIG_5C

MEMORY CONTROLLER FOR INDEPENDENTLY SUPPORTING SYNCHRONOUS AND ASYNCHRONOUS DRAM MEMORIES

This is a continuation of application Ser. No. 08/767,853, filed Dec. 17, 1996 now U.S. Pat. No. 5,721,860, which is a continuation of application Ser. No. 08/248,301 filed May 24, 1994 abandoned.

BACKGROUND OF THE INVENTION

1. Field of the Invention

This invention relates to data communications in a computer system, and more specifically, to memory controllers designed to support different types of memory.

2. Art Background

In the past, computer systems have relied heavily upon Dynamic Random Access Memories ("DRAMs") to implement system memories due to their simplicity, affordability and memory density. However, the performance of DRAMs in modern computer systems is lacking due to their slow access times and their inability to burst data. To overcome these problems, a new type of DRAM has been recently developed to enable faster operation in a synchronous fashion. This type of DRAM is referred to as Synchronous Dynamic Random Access Memory ("SDRAM"), which has been described in the JEDEC Standard published by the Joint Electronics Design Evaluation Conference and is manufactured by NEC Corporation as part number UPD42116420.

Yet, the cost of the new SDRAMs is extremely prohibitive, and since SDRAMs require a completely different memory interface, such devices are not compatible with previous memory controllers which support DRAMs. Hence, although the use of SDRAM memories in modern computer systems is quite desirable, they may not be a wise choice at the moment due to their extremely high cost and the fact that they require specially designed memory controllers.

Accordingly, it would be desirable to provide a single memory controller designed to support both conventional Asynchronous DRAMs ("ADRAMs") and Synchronous DRAMs ("SDRAMs") such that either type of memory may be used in a computer system depending upon the needs of the user. In this way, the user may base the design of the computer system on the type of memory that offers the target price/performance ratio of the system with minimal design changes.

SUMMARY OF THE INVENTION

It is therefore an object of the present invention to provide a memory controller for independently supporting one of a Synchronous DRAM (SDRAM) type memory and an Asynchronous DRAM (ADRAM) type memory via common signal pins.

It is another object of the present invention to provide a memory controller having control means to select between a first ADRAM state machine and a second SDRAM state machine which convert system requests into memory cycles through the generation of memory interface signals appropriate for the particular type of memory selected.

It is further object of the present invention to provide a memory controller having memory control logic in which a request processor is coupled to both a ADRAM state machine and a SDRAM state machine having their output memory interface signals independently selected via a multiplexor for control of a selected memory type.

These and other objects are achieved by providing a memory controller having memory control logic which, in the preferred embodiment, generates both SDRAM and ADRAM memory interface signals and selects as output onto common signal pins either set of interface signals depending upon a memory type setting programmed within a configuration register. The memory control logic comprises at least a request processor in addition to two memory state machines, one for SDRAM and the other for ADRAM memory operations.

When a system bus request is received by the request processor, it is assigned to a request state machine which interacts with both the SDRAM state machine and the ADRAM state machine to generate two sets of memory interface signals in addition to two sets of internal control signals. The sets of signals are input to a multiplexor provided for each type of control signals (i.e., memory interface and internal control), which multiplexors are controlled by a memory type select signal output from a configuration register set. Based on the memory type setting programmed into the configuration registers, the appropriate sets of memory interface and internal control signals (i.e., either SDRAM or ADRAM) are selected for output to the memory array.

According to an alternate embodiment, the memory type select signal output from the configuration registers can also be applied directly to the state machines so as to enable operation of only the selected state machine. In this manner, the memory controller will be able to conserve power by generating only those signals required for the specific type of memory selected.

BRIEF DESCRIPTION OF THE DRAWINGS

FIG. 4(*a*) is a timing diagram depicting the timing of a SDRAM cache line read operation.

FIG. 4(*b*) is a timing diagram depicting the timing of a SDRAM cache line write operation.

FIG. 4(*c*) is a timing diagram depicting the timing of a SDRAM mode register write operation.

FIG. 4(*d*) is a timing diagram depicting the timing of a SDRAM refresh operation.

FIG. 5(*a*) is a timing diagram depicting the timing of an ADRAM cache line read operation.

FIG. 5(*b*) is a timing diagram depicting the timing of an ADRAM cache line write operation.

FIG. 5(*c*) is a timing diagram depicting the timing of an ADRAM CAS-before-RAS refresh operation.

DETAILED DESCRIPTION OF THE INVENTION

The present invention provides a means in a memory controller for independently supporting one of a Synchronous DRAM (SDRAM) and an Asynchronous DRAM (ADRAM) memory via common signal pins. For purposes of explanation, specific embodiments are set forth in detail to provide a thorough understanding of the present invention. However, it will be apparent to one skilled in the art that the present invention may be practiced with other embodiments and without all the specific details set forth. In other instances, well known architectural elements, devices, circuits, process steps and the like are not set forth in detail in order to avoid unnecessarily obscuring the present invention.

I. Overview of the Memory Controller

In accordance with one embodiment of the present invention, the memory controller is implemented in a pipelined, multiprocessor computer system. As shown generally in FIG. 1, the computer system comprises up to 4 microprocessors, a system bus and a memory subsystem which preferably includes a memory controller (MC) for handling memory access requests, a DRAM memory comprising either a SDRAM memory type or an ADRAM memory type, and memory interface components (MICs) for interfacing the MC to the selected memory type.

Figure 1:
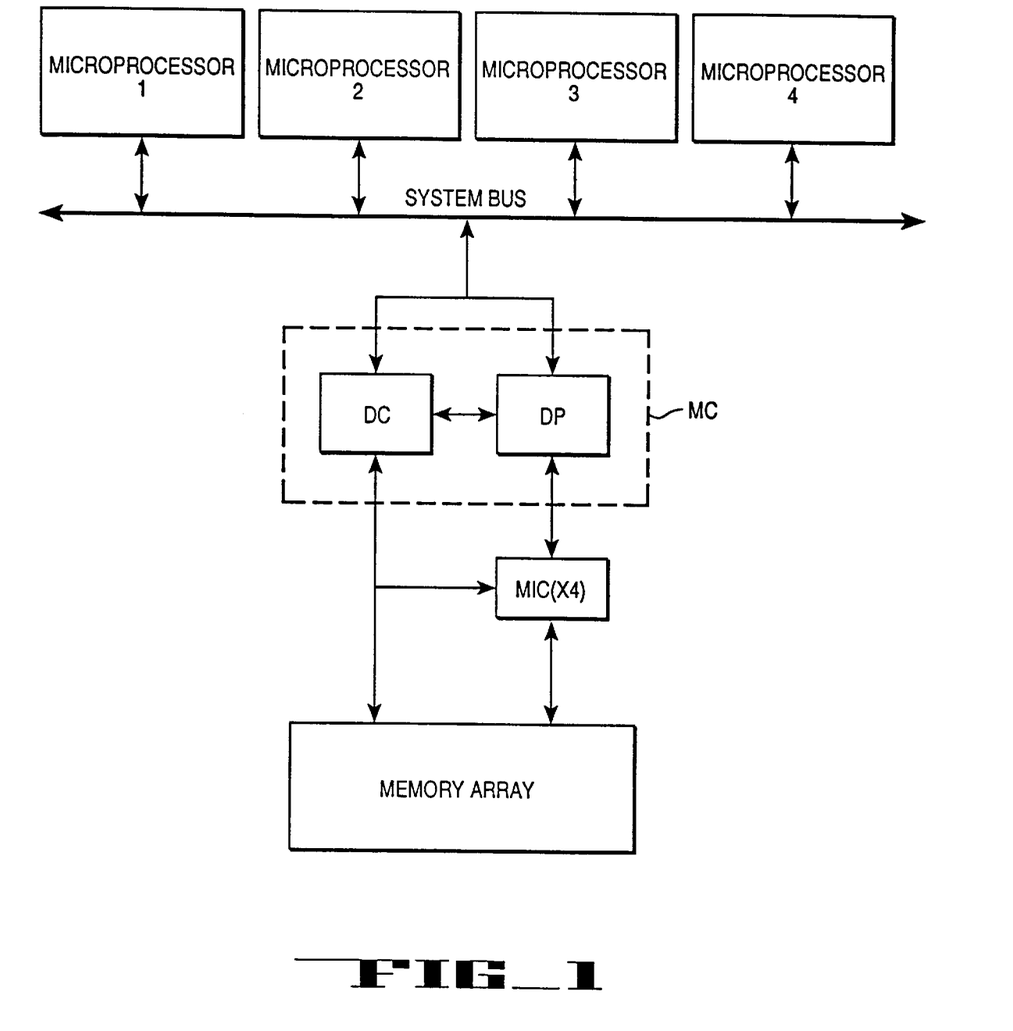
FIG. 1 is a block diagram of a generalized computer system comprising a plurality of microprocessors and a memory subsystem in which a memory controller is coupled to a memory array via memory interface components.

The MC is designed to independently support either a SDRAM memory or a conventional ADRAM memory through the use of memory control logic which selects between the generation of SDRAM and ADRAM memory interface signals. Although in the preferred embodiment the present invention preferably supports a 2:1 interleaved ADRAM memory, other conventional ADRAM memories, whether interleaved or not, can be supported by modifying the number of row and column address strobes in addition to the timing of the strobes to suit the particular memory type chosen.

Figure 2:
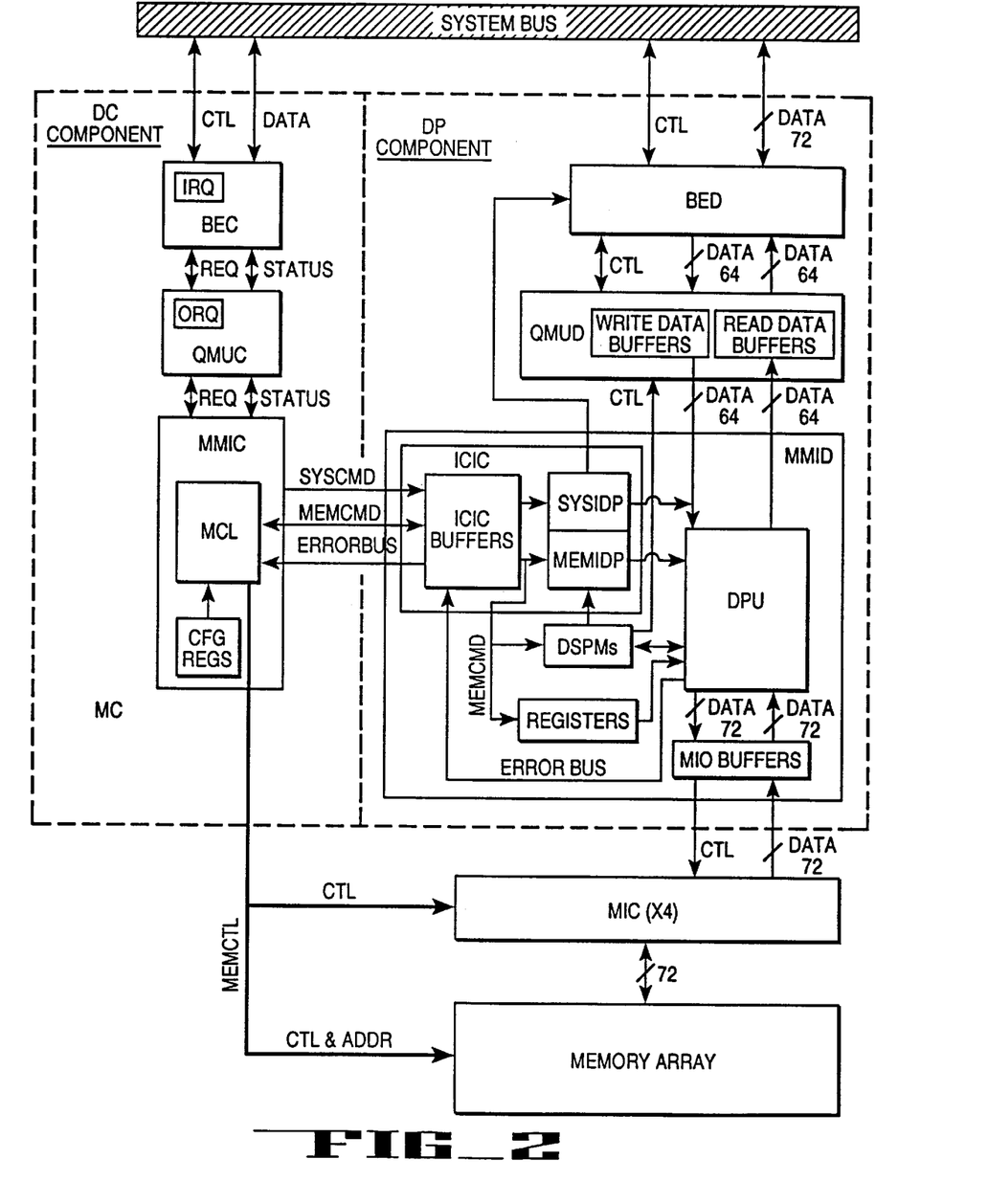
FIG. 2 is a block diagram of the memory controller shown in FIG. 1 in accordance with the present invention.

As shown in FIGS. 1 and 2, the MC is divided into two ASICs, one forming a DRAM Controller (DC) component and the other forming a Data Path (DP) component, thereby separating the address and data flows through the MC to improve the speed and efficiency of the pipelined system. The DC component is responsible for handling all memory access requests and commands in addition to address decoding for the memory accesses, while the DP component is responsible for the flow of data to and from memory.

The components are functionally coupled together via an interchip interconnect (ICIC) which comprises the communications paths and buffers needed to transmit data and control information between the two components. Both ASICs are designed to connect directly to the system bus without external glue components, and together constitute only one bus load. It is noted that although in this particular embodiment the MC is preferably divided into separate ASIC components, it can be implemented as a single package memory controller, and can further be utilized in both multiprocessor and single processor as well as pipelined and non-pipelined systems.

Referring to FIG. 2, the DC component of the MC is functionally divided into three main sections: a Bus Engine (BEC), a Queue Management Unit (QMUC) and a Memory Interface (MMIC). The BEC provides the interface to the system bus, while the QMUC couples the BEC to the MMIC. The BEC contains an in-order request queue (IRQ) for system bus requests in addition to the state machines (not shown) needed to control the system bus and to orchestrate data transfers between the bus and the MC data buffers (not shown). The BEC is also responsible for buffer allocation in the DP component and for control of the system-side interface (SYSIDP) of the ICIC located within the DP component. The QMUC is the primary interface between the BEC and the MMIC and comprises an outbound request queue (ORQ) for buffering system bus requests and corresponding addresses received from the BEC for use by the MMIC in decoding requests and performing memory accesses.

The MMIC provides all of the memory controller specific functionality of the MC. The primary functions of the MMIC are to control the MMIC side of the QMUC, to control the external memory and to control the interchip interface to the DP component. This unit also converts system bus requests into both memory cycles and interchip cycles. With regard to the interface between the MMIC and the ORQ of the QMUC, the MMIC uses the ORQ 1) to provide the effective address of the current request to the ORQ, 2) to read the next request from the ORQ and 3) to read the status of the next request. In this respect, the MMIC also provides response information back to the BEC via the QMUC.

Figure 3:
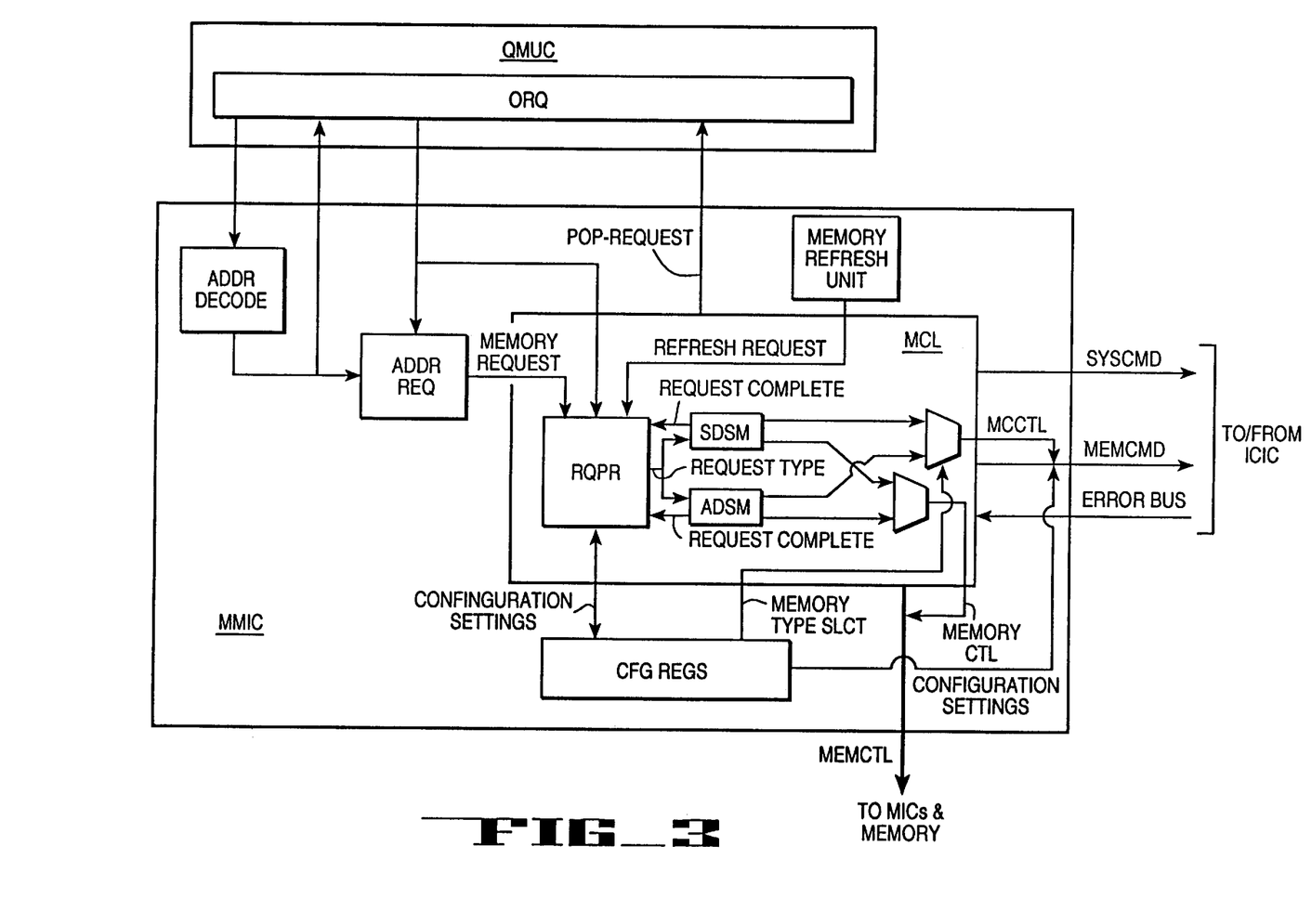
FIG. 3 is a block diagram of selected components of the memory controller shown in FIG. 2 which interact to perform memory type selection and memory interface signal generation in accordance with the present invention.

Referring to FIG. 3, the main units of the MMIC preferably consist of 1) an address decode unit (ADDR Decode) for determining if the registered bus request is destined for the MC and computing an effective address for accesses to the memory array, 2) a request address unit (ADDR Req) for determining where in the memory array the request is destined and for maintaining a table of open pages in the memory array, 3) memory control logic (MCL) for controlling the other units based on the current request from the QMUC and for generating the memory subsystem control signals, the memory-side interchip interconnect signals, the MIC interface signals, and the memory reset and error signals, 4) a configuration register unit (CFG REG) which contains all the configuration registers, logic and state machines required to precalculate internal parameters and control the reading and writing of configuration space via the ICIC, and 5) a memory refresh unit (Memory Refresh) for controlling the memory refresh rate.

On the datapath side, shown in FIG. 2, the DP component of the MC supports the data flow between the system bus and the memory array and is disassociated from the memory control interfaces since all controls for the bus and the memory interface are generated by the DC component. The main functions of the DP component are to provide a 64 bit datapath from the bus to memory, to provide ECC support for data both on the bus and in memory, to scrub (or correct) any correctable errors in the memory array and to provide support for single clock cycle data transfer bursts.

Similar to the DC component, the DP is functionally divided into three main sections: a Bus Engine (BED), a Queue Management Unit (QMUD) and a Memory Interface (MMID). The BED provides the interface to the system bus, while the QMUD couples the BED and the MMID through a set of request queues (not shown) and a plurality of data buffers. The QMUD comprises a set of read data buffers for temporarily buffering data read from memory before it is placed on the system bus and a set of write data buffers for temporarily buffering write data received from the system bus before it is written to memory. The status of each request is kept track of by the MCL of the DC component from which the transaction commands are generated. To maximize system performance in a pipelined system, each set of data buffers preferably comprises four buffers such that a total of eight different memory accesses may be in process at any one time. Nonetheless, any number of read and write data buffers may be used in either a pipelined or non-pipelined system without departing from the spirit of the present invention.

Also shown in FIG. 2, the MMID comprises a plurality of data and control interfaces to the QMUD, the BED, the ICIC and the external memory array. The main functional units of the MMID include 1) the memory input/output (MIO) buffers, which buffer the signals used to access the memory array, 2) the DP operation registers, which can be programmed via the DC component for operational control of the DP component, 3) the data path unit (DPU), which transfers and converts the data from the QMUD buffers to the selected memory locations and vice versa via unidirectional read and write data busses, 4) the ICIC, which includes the ICIC buffers, the system-side interface to the DP component (SYSIDP) and the memory-side interface to the DP component (MEMIDP) for buffering data and commands received from the MCL of the DC component and converting the commands into data transfer control signals, and 5) the datapath state machines (DPSMs), which provide the control for all other data path blocks based on the current command from the MCL via the ICIC.

Bus requests that target the MC will result in at least one command being generated by the MCL and transmitted to the SYSIDP where the commands are processed and converted into control signals which then direct the flow of data from the BED to the QMUD or vice versa. The commands processed by the SYSIDP will also be sent to the MEMIDP to initiate data transfers to or from memory, or, in the case of configuration register programming, to and from the DC component. Additionally, since all programmer visible configuration registers reside in the DC component, the data to be written to those registers must be transferred to the DC component via the MEMIDP. After the configuration registers have been programmed, the DC component will then generate separate commands to configure the DP component for proper operation.

II. Request Processing and Signal Generation

With reference to FIG. 3, in order for the MCL to generate the proper control signals for the specific memory type implemented and selected via programming of the configuration registers, the MCL is provided with a request processor (RQRP) in addition to two memory state machines, a SDRAM state machine (SDSM) and an ADRAM state machine (ADSM). The RQPR is responsible for processing memory requests that appear at the head of the ORQ and for handling refresh requests from the Memory Refresh unit.

The RQPR interacts with the memory state machines to generate both the memory control signals (including MIC signals) that are sent to the memory array and the internal MC control signals sent to the DP component via the ICIC. In the preferred embodiment, the RQPR can handle up to two simultaneous requests so as to allow optimal back-to-back transfers in all situations.

Although not shown, the RQPR is composed of a request sequencer (RQSR) and two request state machines (RQSMs). Requests presented to the RQPR are monitored by the RQSR. If there are no requests, a RQSM is selected to monitor for any incoming requests. If there are requests being processed, the RQSR keeps track of when requests are issued, when they are popped off of the ORQ, and when they complete. If the request is a memory access, the RQSR selects the next RQSM to process the request. The selected RQSM then controls the memory state machines to generate the required memory timing for the particular memory type selected.

The SDSM converts memory requests into memory cycles through the generation of appropriate RAS#, CAS#, WE#, CKE and CS# signals shown below in TABLE I. Because the timing for this SDRAM signal generation is dependent upon the current state of the memory banks in addition to the particular memory operation being performed, the signal timing for the different SDRAM memory operations is pictorially shown in FIGS. 4(a) to 4(d). Information on the exact memory cycle that needs to be run comes from a page open table and a bank state table (neither shown). From outputs generated by comparing the request address to the page open table, the SDSM can determine whether or not it is necessary to open a new page. Also, banks will be powered up as required based on information from the bank state table.

The ADSM works much like the SDSM, however, it produces memory cycles for DRAM memory by generating the appropriate RAS#, CAS# and WE# memory interface signals, also shown in TABLE I. Again, the signal timing for the different ADRAM memory operations is pictorially shown in FIGS. 5(a) to 5(c) for the 2:1 interleaved ADRAM memory utilized in the preferred embodiment. It is further noted that for a conventional DRAM memory, open pages are equal to powered up pages, so that the bank state table and flexible power management are not used (except for the maximum number of open pages).

The preferred mapping of the signal pins for the different memory types in addition to the physical signal pin sets used to transmit these signals to the DC component and to memory is shown below in TABLE I. Note that many of the pins are mode dependent so that they provide completely different functions depending on the type and configuration of memory defined in the configuration registers.

TABLE I

Signal Mapping Between Memory Types

| SDRAM | ADRAM | Physical Signal Pin Sets |
|---|---|---|
| MA[12:0] | MA[12:0] | [12:0] |
| CS#[15:0] | RAS#[15:0] | [28:13] |
| CKE[7:0] | CAS#[7:0] | [36:29] |
| SRAS# | (Not Used) | [37] |
| SCAS# | (Not Used) | [38] |
| SWE# | WE# | [39] |

The signals asserted on the signal pins are defined below with respect to each memory type:

MA[12:0]—Multiplexed row and column Address signals 0 through 12 for both memory types.

SRAS#—The Row Address Strobe for SDRAM memory. This is an active low signal which defines the row address when accessing SDRAM memory. RAS# is used in conjunction with CS#[15:0] and the SDRAM clock to latch the row address in the SDRAM. RAS# is common to all banks of SDRAM, but is not used in DRAM memory.

SCAS#—The Column Address Strobe for SDRAM memory. This is an active low signal which defines the column address when accessing SDRAM. CAS# is used in conjunction with CS#[15:0] and the SDRAM clock to latch the column address in the SDRAM. CAS# is common to all banks of SDRAM, but again is not used with ADRAM memory.

SWE# & WE#—The Write Enable Signal for both types of memory. This is an active low signal which specifies whether the current operation is a write to or a read from memory. WE# is common to all banks of both SDRAM memory and ADRAM memory.

CS#[15:0]—Command Select signals 0 through 15 for SDRAM memory. An active low CS# specifies which row of SDRAM is currently being accessed. The control signals associated with CS# must be active with CS# and the rising edge of the SDRAM Clock.

RAS#[15:0]—row address strobe 0 through 15 for ADRAM memory. These active low signals latch the row address being driven on MA[12:0] (falling edge only) and define that the row is active (steady state low) when accessing DRAM.

CKE[7:0]—Clock Enable 0 through 7 for SDRAM memory. Clock enables are provided by the MC to allow rows of SDRAM to be put in standby mode while not being accessed. This reduces the overall power consumption of the Memory Subsystem. One CKE is provided for each row of memory. When active, the row is accessible using the relevant control signals (CS#, RAS#, CAS#, etc.).

CAS#[7:0]—column address Strobe 0 through 7 for ADRAM memory. These active low signals latch the column address when accessing ADRAM.

III. Memory Operations

When a system bus request reaches the head of the in-order ORQ, the ADDR Decode unit will decode the physical address of the request to determine if the request is a memory access. If it turns out to be a memory access, the ADDR Decode unit then calculates an effective address for the request and sends it to the ADDR REQ unit which maintains a page open table to compare the request address against the addresses of open pages in memory. RAS and CAS address generation modules (not shown) within the ADDR REQ unit split the remainder of the address, at the point determined by the row size, into the RAS and CAS portions.

The request is then sent to the RQPR of the MCL and assigned to a RQSM which, in the preferred embodiment, interacts with both the SDSM and the ADSM to generate the SDRAM and ADRAM control signals, respectively, shown in Table I above. Both memory state machines operate on the request to generate as a first output the internal MC control signals and as a second output the memory control signals in accordance with the current state of the memory bank being accessed and the type of request presented. The first output from each of the memory state machines is then input to a first, memory signal multiplexor, while the second output from each memory state machine is similarly input to a second, MC signal multiplexor.

Each of the first and second multiplexors have as a control input a memory type select signal output from the configuration registers. Based on the memory type setting programmed into the configuration registers, the memory type select signal causes each of the first and second multiplexors to output the first and second outputs, respectively, of the SDSM or the ADSM. The outputs of the multiplexors are then input to corresponding D-Q flip-flops (not shown) to latch the signals before placing them on the corresponding MEMCMD and Memory CTL busses. Subsequently, the output of the first, memory signal multiplexor is sent to the MICs and to memory via the MEMCTL bus to strobe the memory devices and enable the memory access, while the output from the second, MC signal multiplexor is sent to the DP component via the MEMCMD bus to initiate the data transfer.

Although in the preferred embodiment, both the SDRAM and ADRAM control signals are simultaneously generated and subsequently selected through the use of multiplexors, in an alternate embodiment, only one type of control signal generation is performed in order to conserve power. This is accomplished by further applying the memory type select signal output from the configuration registers directly to the state machines so as to select just one type of signal generation by enabling only the desired state machine. Furthermore, in another alternate embodiment, both of the memory state machines can be combined into a single memory state machine whose transitions and outputs are controlled by the settings within the configuration registers.

As previously noted, the details of how memory access requests are acted upon by the memory state machines depend first upon the type of memory implemented within the system, then the state of the memory bank being accessed (i.e., has the bank been precharged or not, has the bank received a row address, etc.?), and finally, the type of request presented (i.e., whether it is a read or write and whether it is a burst or partial transfer). These dependencies will be discussed below, first for accesses to SDRAM memory, and then for accesses to ADRAM memory.

For a memory array comprising SDRAM memory, a bank of memory can be in one of the following states:

1) Inactive—The bank is precharged and powered down, and is performing auto refresh.
3) Precharging—The bank has received a precharge command or is performing auto precharge.
4) Standby—Precharge is complete and the device is waiting to receive a row address.
5) Ready—A row address has been received and the bank is ready for a column address.
6) Active—The bank has received a column address and is currently reading or writing data.

When a bank is Inactive, it has been precharged and powered down, and is performing auto refresh. This state is entered by deasserting the CKE signal to the physical bank. This means that the two logical banks in the physical bank both enter the Inactive state. When CKE is again asserted, the two physical banks will enter the Standby state, meaning that precharge is complete (it was done before entering the inactive state) and the bank is waiting to receive a row address. From the Standby state, the bank will enter the read state when a row address is clocked in. From there, the bank can enter the active state if a column address is clocked in, or the Precharging state if either a precharge command is given or a specified access is complete and auto precharge is enabled. When in the Ready state, a page hit will move the bank into the Active state. A page miss will cause the MC to issue a precharge command and transition the bank into the Precharging state.

For a SDRAM type memory, each bank is programmed to read or write a specified burst length. This is additional information that must be maintained by the MC because it will effect the way an access is handled. For example, if the next request is for a cache-line burst and the burst length is one (because the last operation was a single word access), then a command must first be sent to set the burst length appropriately.

For a memory array comprising conventional ADRAM, a bank of memory can be in one of the following states:

1) Precharging—RAS# and CAS# are deasserted and sense amp data is being written back to the array.
2) Standby—Precharge is complete and the device is waiting to receive a row address. The bank is in standby power mode when in this state.
3) Ready—A row address has been received and the bank is ready for a column address.

4) Active—The bank has received a column address and is currently reading or writing data.

When a conventional ADRAM bank is in Standby, it is precharged and waiting for a row address. The next access to this bank will be a page miss and will cause a transition to the Ready state. If a column address is then asserted the bank goes to the Active state. If RAS# is deasserted, the bank goes to the Precharging state. After a predefined delay, the bank will then enter the Standby state. In an ADRAM type memory, the access type only affects the number of CAS# accesses performed. For a single word, CAS# is asserted to the selected interleave, and for a cache line it is asserted 4 times to each interleave.

SDRAM operations are controlled primarily by the CS# lines. CS# gates all other signals in the SDRAM, and along with CKE, are the only timing critical signals in the SDRAM memory system. The other control signals are ignored until the CS# line is active and there is a rising edge of the SDRAM clock. This allows the MC to switch MA[12:0], RAS#, and CAS# lines at half the frequency of the CS# lines.

Data transfer operations to SDRAM memory devices currently in standby begin with assertion of the row address, followed by the column address, after which the data becomes available. With the row and column addresses latched internally, several optimizations can be made. For instances, blocks of data can be read or written at variable lengths to minimize control activity and maximize data transfer rate. Additionally, the MC uses a burst length of four to access the SDRAM memory devices. A cache line access requires two bursts, while a partial requires one.

With reference to the timing diagrams of FIGS. 4(a) through 4(d), and FIGS. 5(a) through 5(c), the timings for the various SDRAM and ADRAM type memory operations, respectively, will be described. It is noted that although ADRAM memory devices run asynchronously, and hence do not require a clock, the MC clock, which preferably runs at 66.7 MHz, is shown for reference.

Figure 4A:
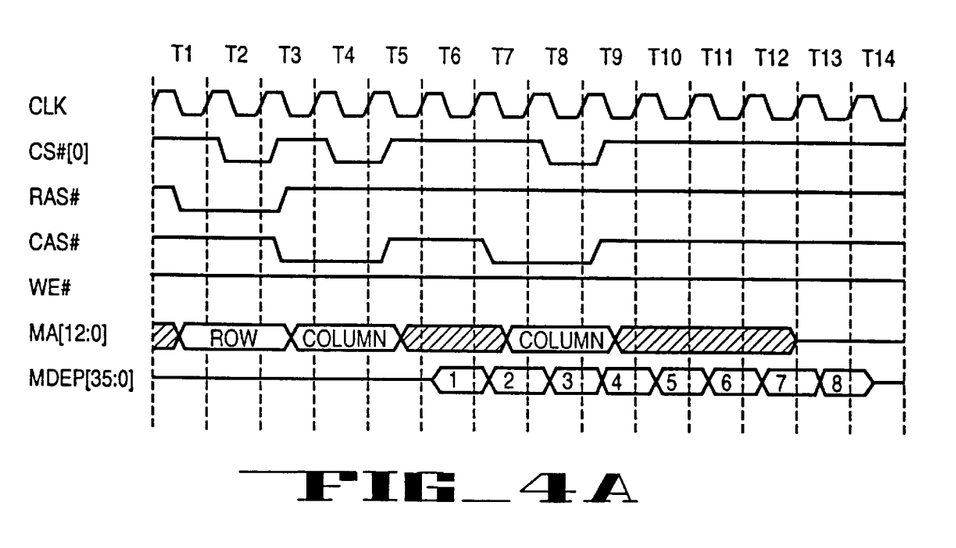

FIG. 4(a) is representative of a cache line read from an SDRAM bank of memory. In cycle T1, the row address and RAS# signal are asserted to the SDRAM devices, and in T2, the CS# signal is asserted to select the RAS# command. The CAS# command is entered in cycles T3 and T4. In T6, the data is driven on the memory data bus to the MC. The next column address is asserted in cycles T5 and T6. Data for the second burst follows the first burst starting in cycle T9. A partial read would proceed in a similar way, except that only one burst of four would be transferred. For back-to-back requests, the second request could be started as early as cycle T10.

Figure 4B:
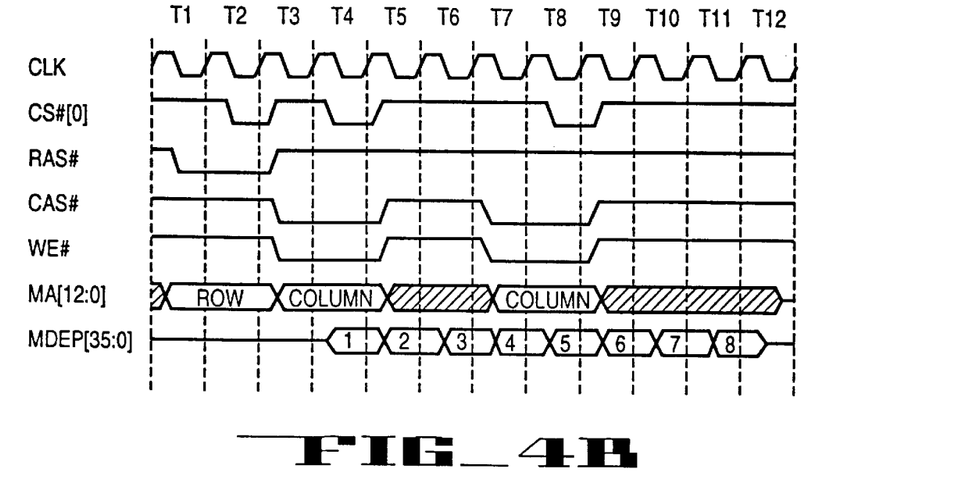

FIG. 4(b) shows a timing diagram for a cache line write to an SDRAM bank of memory. SDRAM writes proceed much the same as reads but with the addition of WE# being active with CAS#. Data is supplied by the MC at the same time as the CS# for the CAS# command and then every clock thereafter until the request dependent burst length is met.

Figure 4C:
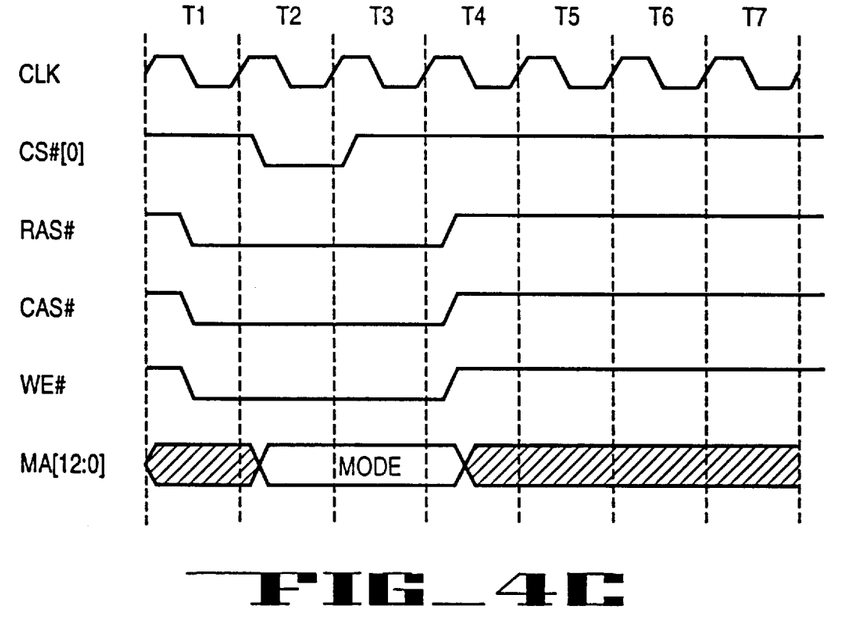

Shown in FIG. 4(c), mode register writes occur when the burst length or latency of the SDRAM needs to be changed. This can occur when changing from cache line accesses to partial accesses, for example. The Mode value will be generated automatically by the MC depending on requirements for current access and past access settings.

Figure 4D:
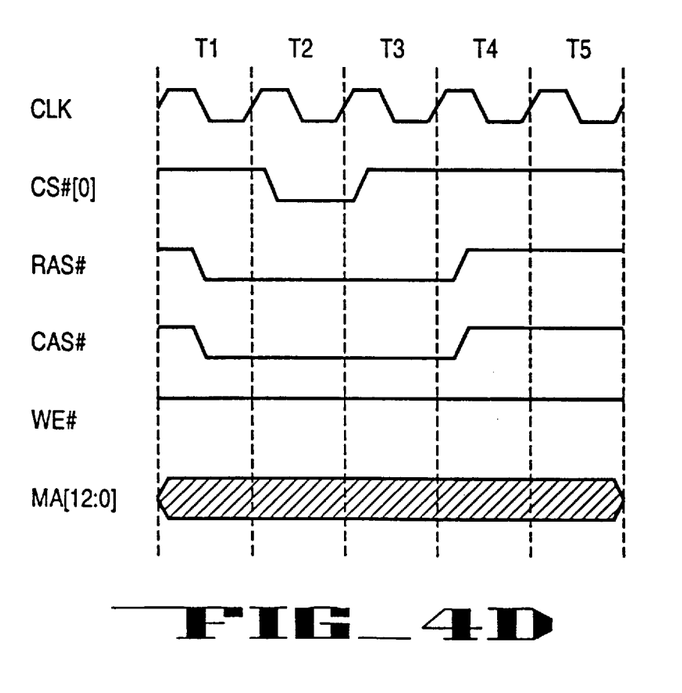

An SDRAM refresh operation, shown in FIG. 4(d), is characterized by RAS#, CAS# and WE# being active with CS# active and a rising Clock edge at the SDRAMs. This is equivalent to the CAS-before-RAS type refresh operations in conventional DRAM devices. Possible precharge and cycle completion times are not shown in the SDRAM refresh figure.

Figure 5A:
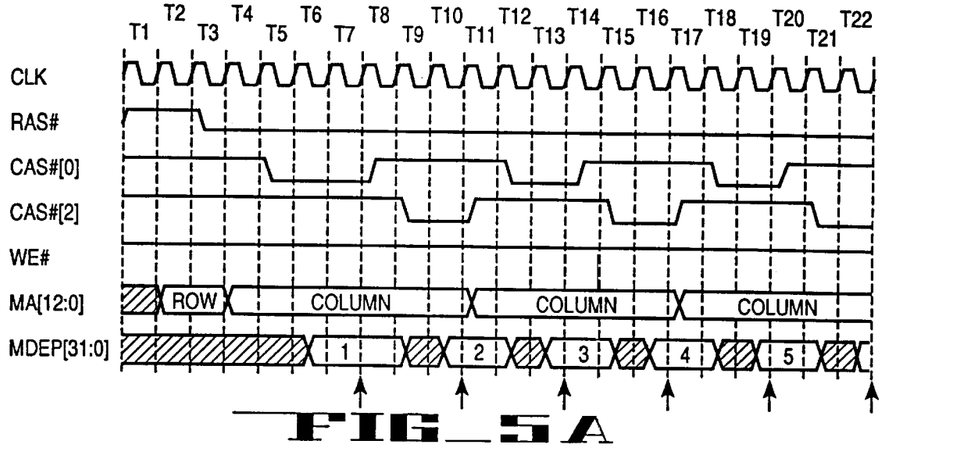

As shown in FIG. 5(a), ADRAM reads are controlled by both RAS# and CAS#. Following the RAS# precharge time, RAS# goes active which latches the row address into the ADRAM. CAS# then falls which latches the column address into the ADRAM. Data is available some time later for clocking into the memory controller. Successive access only require CAS# to be deasserted and then asserted to latch the next column address and make the next data available. This is referred to as fast page mode reads and provides reasonable access rates for cache line transfers.

In T1 and T2, the selected row is precharged, while in T2 and T3, the row address is asserted, The during T3, RAS# is asserted and the row address is latched into the selected ADRAMs. CAS#[0], for the first interleave, is asserted in T5. This satisfies the minimum RAS# to CAS# timing of 20 nsec and the maximum RAS# to CAS# timing of 60 nsec. CAS#[0] is held until T8 to satisfy the minimum CAS# hold time of 70 nsec. The first data word is then clocked into the MC on the rising edge of T8 and CAS#[0] is deasserted in T8. In T9, CAS#[2] is asserted to access the second interleave. The non-overlapping CAS's prevents contention on the data bus. Data for the second interleave can be clocked into the MC on the rising edge of clock T1. This pattern of CAS's continues until the burst is complete.

Figure 5B:
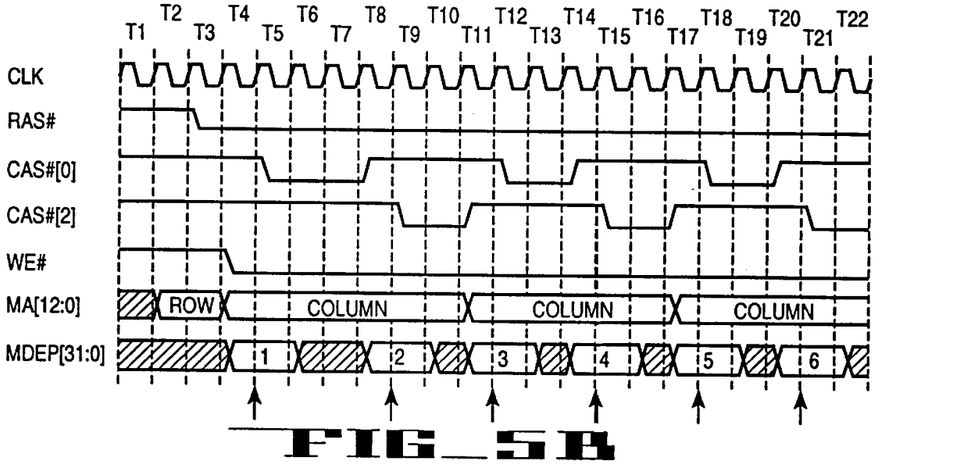

Referring to FIG. 5(b), ADRAM writes are controlled by RAS#, CAS#, and WE#. Following the RAS# precharge time, RAS# goes active which latches the address into the ADRAM. CAS# then falls which latches the column address and the data into the ADRAM. Successive accesses only require CAS# to be deasserted and then asserted to latch the next column address and the next data into the ADRAM. This is referred to as fast page mode early writes and provides reasonable access rates for cache line transfers.

Figure 5C:
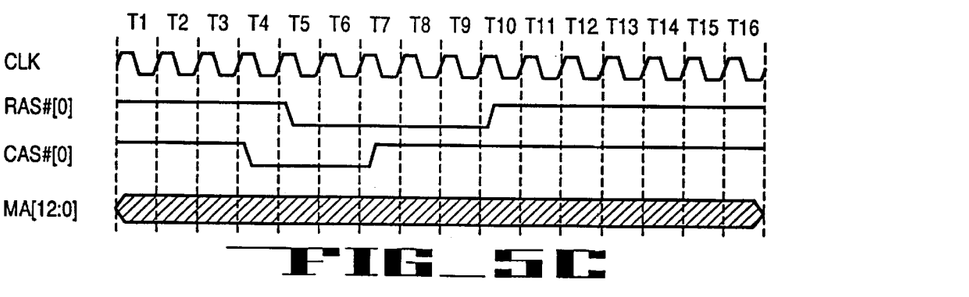

As shown in FIG. 5(c), ADRAM refresh operations are done using CAS before-RAS refresh type operations. This requires minimum overhead in the MC since addresses do not need to be generated.

It will be appreciated that various modifications and alterations might be made by those skilled in the art without departing from the spirit and scope of the present invention. Thus, it is understood that the invention is not to be limited by the foregoing illustrative details, but rather is to be defined by the appended claims.

We claim:

1. In a memory controller coupled to memory array via a memory interface bus and having memory control logic for controlling the transfer of data to and from the memory array, a method is provided for independently controlling a Synchronous (SDRAM) and an Asynchronous Dynamic Random Access Memory (ADRAM) device via common signal pins, the method comprising the steps of:

receiving a memory access request by the memory control logic;

generating by the memory control logic a plurality of SDRAM memory interface signals in response to an SDRAM memory access request received by the memory control logic and a plurality of ADRAM memory interface signals for conducting a memory access to ADRAM type memory in response to an ADRAM memory access request;

providing the plurality of SDRAM memory interface signals and the plurality of ADRAM memory interface signals as inputs to a multiplexor, the multiplexor having a memory type select signal for selecting as output the plurality of SDRAM memory interface signals or the plurality of ADRAM memory interface signals;

outputting from the multiplexor the plurality of SDRAM memory interface signals when the memory type select signal indicates that the memory array comprises a SDRAM memory type; and outputting from the multiplexor the plurality of ADRAM memory interface signals when the memory type select signal indicates the memory comprises an ADRAM device.

2. The method of claim 1, wherein the method further comprises the step of mapping the plurality of SDRAM memory interface signals and the plurality of ADRAM memory interface signals to common signal pins coupled to the memory interface bus in accordance with the table shown below:

| SDRAM Signals | ADRAM Signals | Common Signal Pins |
|---|---|---|
| MA[12:0] | MA[12:0] | [12:0] |
| CS#[15:0] | RAS#[15:0] | [28:13] |
| CKE[7:0] | CAS#[7:0] | [36:29] |
| SRAS# | (Not Used) | [37] |
| SCAS# | (Not Used) | [38] |
| SWE# | WE# | [39] |

3. The method of claim 1, wherein the method further comprises the step of generating the memory type select signal from one of a memory type setting programmed in a configuration register by a user and configuration register to be activated by a user upon implementing one of the SDRAM and the ADRAM memory types.

4. The method of claim 1, wherein the step of generating by the memory control logic a plurality of SDRAM memory interface signals and a plurality of ADRAM memory interface signals further comprises the steps of:

receiving a memory access request by a request processor of the memory control logic; and issuing from the request processor a corresponding request type of the memory access request to both a SDRAM state machine and an ADRAM state machine for generating the plurality of SDRAM memory interface signals and the plurality of ADRAM memory interface signals, respectively.

5. The method of claim 4, wherein the step of generating by the memory control logic a plurality of SDRAM memory interface signals and a plurality of ADRAM memory interface signals further comprises the steps of:

generating by the SDRAM state machine Memory Address (MA) signals, Command Select (CS#) signals, ClocK Enable (CKE) signals, a Synchronous Row Address Strobe (SRAS#) signal, a Synchronous Column Address Strobe (SCAS#) signal and a Synchronous Write Enable (SWE#) signal for conducting a memory access to SDRAM type memory in accordance with the request type issued by the request processor; and generating by the ADRAM state machine Memory Address (MA) signals, Row Address Strobe (RAS#) signals, Column Address Strobe (CAS#) signals and a Write Enable (WE#) signal for conducting a memory access to ADRAM type memory in accordance with the request type issued by the request processor.

6. The method of claim 5, wherein the method further comprises the step of mapping the plurality of SDRAM memory interface signals and the plurality of ADRAM memory interface signals to common signal pins coupled to the memory interface bus in accordance with the table shown below:

| SDRAM Signals | ADRAM Signals | Common Signal Pins |
|---|---|---|
| MA[12:0] | MA[12:0] | [12:0] |
| CS#[15:0] | RAS#[15:0] | [28:13] |
| CKE[7:0] | CAS#[7:0] | [36:29] |
| SRAS# | (Not Used) | [37] |
| SCAS# | (Not Used) | [38] |
| SWE# | WE# | [39] |

7. In a memory controller coupled to memory array via a memory interface bus and having memory control logic for controlling the transfer of data to and from the memory array, a method is provided for independently controlling a Synchronous Dynamic Random Access Memory (SDRAM) and an Asynchronous Dynamic Random Access Memory (ADRAM) device via common signal pins, the method comprising the steps of:

receiving a memory access request by the memory control logic;

determining whether the memory array comprises a SDRAM memory device or an ADRAM memory device;

generating by the memory control logic a set of SDRAM memory interface signals in response to the memory access request received by the memory control logic when it is determined that the memory array comprises a SDRAM memory device;

generating by the memory control logic a set of ADRAM memory interface signals in response to the memory access request received by the memory control logic when it is determined that the memory array comprises an ADRAM memory device; and inputting the set of SDRAM memory interface signals and the plurality of ADRAM memory interface signals to a multiplexor, the multiplexor having as a control input a memory type select signal for selecting as output on the common signal pins the set of SDRAM memory interface signals and the set of ADRAM memory interface signals in accordance with the memory type select signal.

8. The method of claim 7, wherein the step of determining whether the memory array comprises a SDRAM memory device or an ADRAM memory device is performed by the step of detecting a memory type setting programmed into a configuration register of the memory controller by a user.

9. The method of claim 7, wherein the step of determining whether the memory array comprises a SDRAM memory device or an ADRAM memory device is performed by the step of detecting whether a configuration register has been activated by a user upon implementing one of the SDRAM and the ADRAM memory devices.

10. In a memory controller coupled between a system bus and memory and having memory control logic for controlling the transfer of data to and from the memory array, an apparatus is provided for independently controlling a Synchronous Dynamic Random Access Memory (SDRAM) and an Asynchronous Dynamic Random Access Memory (ADRAM) memory type via common signal pins, the apparatus comprising:

a memory interface bus coupled between the memory control logic and the memory array for transmitting memory interface signals generated by the memory control logic to the memory array to control memory operations;

the memory control logic generating both SDRAM memory interface signals and ADRAM memory interface signals in response to a memory access request for conducting a memory access to one of an SDRAM type memory and ADRAM type memory in accordance with the memory access request; and a multiplexor having a first input configured to receive SDRAM memory interface signals, a second input configured to receive ADRAM memory interface signals and a third input configured to receive a memory type select signal for selecting one of the memory interface signals from the multiplexor, the multiplexor outputting SDRAM memory interface signals when the memory type select signal indicates the memory array comprises a SDRAM memory type and outputting ADRAM memory interface signals when the memory type select signal indicates the memory array comprises an ADRAM memory type.

11. The apparatus of claim 10, wherein the memory type select signal is generated by one of a memory type setting programmed in a configuration register by a user and a configuration register to be activated by a user upon implementing one of the SDRAM and the ADRAM memory types.

12. The apparatus of claim 10, wherein the memory control logic comprises an SDRAM state machine, an ADRAM state machine and a request processor, the request processor receiving memory access requests from the system bus and issuing corresponding request types to both the SDRAM state machine and the ADRAM state machine to generate the SDRAM memory interface signals and the ADRAM memory interface signals, respectively.

13. The apparatus of claim 12, wherein the SDRAM memory interface signals generated by the memory control logic comprises SDRAM Memory Address signals, SDRAM Command Select signals, SDRAM ClocK Enable signals, an SDRAM Synchronous Row Address Strobe signal, an SDRAM Synchronous Column Address Signal and an SDRAM Synchronous Write Enable signal, and the ADRAM memory interface signals generated by the memory control logic comprises ADRAM Memory Address signals, ADRAM Row Address Signals, ADRAM Column Address Strobe signals and an ADRAM Write Enable signal, with the SDRAM memory interface signals and the ADRAM memory interface signals being mapped to common signal pins coupled to the memory interface bus in accordance to their common types of signals.

14. In a computer system comprising a microprocessor, a memory array, a system bus for coupling the microprocessor to the memory array and to a plurality of bus agents having input/output devices, and a memory controller having memory control logic for controlling accesses to the memory array, an apparatus is provided in the memory controller for independently supporting one of a Synchronous Dynamic Random Access Memory (SDRAM) and an Asynchronous Dynamic Random Access Memory (ADRAM) memory type via common signal pins, the apparatus comprising:

a memory interface bus coupled between the memory control logic and the memory array for transmitting memory interface signals generated by the memory control logic to the memory array to control memory operations;

the memory control logic generating SDRAM memory interface signals and ADRAM memory interface signals in response to a memory access request for conducting a memory access to SDRAM memory type and ADRAM memory type, respectively, in accordance with the memory access request; and a multiplexor having a first input for receiving the SDRAM memory interface signals, a second input for receiving the ADRAM memory interface signals and a third input for receiving a memory type select signal for selecting one of the memory interface signals from the multiplexor, the multiplexor outputting the SDRAM memory interface signals when the memory type select signal indicates the memory comprises a SDRAM memory type and outputting the ADRAM memory interface signals when the memory type select signal indicates the memory comprises an ADRAM memory type.

15. In a memory controller coupled to memory via a memory interface bus and having memory control logic for controlling the transfer of data to and from the memory array, a method is provided for independently supporting a first type of Dynamic Random Access Memory (DRAM) type memory and second type of DRAM type memory, via common signal pins the method comprising the steps of:

receiving a memory access request by the memory control logic;

generating a first set of DRAM memory interface signals and a second set of DRAM memory interface signals by the memory control logic for conducting a memory access to one of a first DRAM type memory and a second DRAM type memory, the second DRAM type memory having a substantially different command protocol than the first DRAM type memory, in accordance with the memory access request received by the memory control logic;

providing each of the generated sets of memory interface signals as inputs to a multiplexor, the multiplexor having as a control input a memory type select signal for selecting as output one of the sets of memory interface signals;

outputting from the multiplexor the first set of DRAM memory interface signals when the memory type select signal indicates the memory comprises a first DRAM memory type; and outputting from the multiplexor the second set of DRAM memory interface signals when the memory type select signal indicates the memory comprises a second DRAM memory type.

16. The method of claim 15, wherein the method further comprises the step of mapping the first set of DRAM memory interface signals and the second set of DRAM memory interface signals to common signal pins coupled to the memory interface bus in accordance with their common respective functions.

17. The method of claim 15, wherein the method further comprises the step of generating the memory type select signal from one of a memory type setting programmed in a configuration register by a user and a configuration register to be activated by a user upon implementing one of the First DRAM and the Second DRAM memory types.

18. The method of claim 15, wherein the step of generating a first set of DRAM memory interface signals and a second set of DRAM memory interface signals by the memory control logic further comprises the steps of:

receiving a memory access request by a request processor of the memory control logic; and issuing from the request processor a corresponding request type of the memory access request to both a first DRAM state machine and a second DRAM state machine for generating the first set of SDRAM memory interface signals and the second set of DRAM memory interface signals, respectively.

19. The method of claim 18, wherein the step of generating a first set of DRAM memory interface signals and a second set of DRAM memory interface signals by the memory control logic further comprises the steps of:

generating by the first DRAM state machine First Memory Address signals, First Command Select signals, First Clock Enable signals, a First Row Address Strobe signal, a First Column Address Strobe signal and a First Write Enable signal for conducting a memory access to the first DRAM type memory in accordance with the request type issued by the request processor; and generating by the second DRAM state machine Second Memory Address signals, Second Row Address Strobe signals, Second Column Address Strobe signals and a Second Write Enable signal for conducting a memory access to a second DRAM type memory in accordance with the request type issued by the request processor.

20. The method of claim 19, wherein the method further comprises the step of mapping the first set of DRAM memory interface signals and the second set of DRAM memory interface signals to common signal pins coupled to the memory interface bus in accordance with their common respective functions.

21. In a memory controller coupled to a memory array via a memory interface bus and having memory control logic for controlling the transfer of data to and from the memory array, a method is provided for independently controlling a first DRAM and a second DRAM memory type via common signal pins, the method comprising the steps of:

receiving a memory access request by the memory control logic;

determining whether the memory comprises a first DRAM memory type or a second DRAM memory type;

generating by the memory control logic a first set of DRAM memory interface signals for conducting a memory access to the first DRAM type memory in accordance with the memory access request received by the memory control logic when it is determined that the memory comprises a first DRAM memory type;

generating by the memory control logic a second set of DRAM memory interface signals for conducting a memory access to a second DRAM type memory in accordance with the memory access request received by the memory control logic when it is determined that the memory comprises a second DRAM memory type; and transferring the generated set of memory interface signals to a multiplexor, the multiplexor having a control input to the memory type select signal for selecting as output on the common signal pins the set of memory interface signals generated by the memory control logic in accordance with the memory type select signal.

22. The method of claim 21, wherein the step of determining whether the memory comprises a first DRAM memory type or a second DRAM memory type is perfected by the step of detecting a memory type setting programmed into a configuration register of the memory controller by a user.

23. In a memory controller coupled between a system bus and a memory array and having memory control logic for controlling the transfer of data to and from the memory array, an apparatus is provided for independently controlling a first DRAM and a second DRAM memory type via common signal pins, the apparatus comprising:

a memory interface bus coupled between the memory control logic and memory for transmitting memory interface signals generated by the memory control logic to the memory array to control memory operations;

the memory control logic generating in response to receipt of a memory access request a first set of DRAM memory interface signals and a second set of DRAM memory interface signals for conducting a memory access to the first DRAM type memory and the second DRAM type memory, respectively, in accordance with the memory access request; and a multiplexor configured to receive as a first input the first set of DRAM memory interface signals, as a second input the second set of DRAM memory interface signals and as a third input a memory type select signal for selecting as output from the multiplexor one of the sets of memory interface signals, the multiplexor outputting the first set of DRAM memory interface signals when the memory type select signal indicates the memory comprises a first DRAM memory type and outputting the second set of DRAM memory interface signals when the memory type select signal indicates the memory comprises a second DRAM memory type.

24. The apparatus of claim 23, wherein the memory type select signal is generated by one of a memory type setting programmed in a configuration register by a user and a configuration register to be activated by a user upon implementing one of the first DRAM and the second DRAM memory types.

25. The apparatus of claim 23, wherein the memory control logic comprises a first DRAM state machine, a second DRAM state machine and a request processor, the request processor receiving memory access requests from the system bus and issuing corresponding request types to both the first DRAM state machine and the second DRAM state machine to generate one of the first set of DRAM memory interface signals and the second set of DRAM memory interface signals.

26. The apparatus of claim 25, wherein the first set of DRAM memory interface signals generated by the memory control logic comprises First Memory Address signals, First Command Select signals, First ClocK Enable signals, a First Row Address Strobe signal, a First Column Address Signal and a First Write Enable signal, and the second set of DRAM memory interface signals generated by the memory control logic comprises Second Memory Address signals, Second Row Address Signals, Second Column Address Strobe signals and a Second Write Enable signal, with the first set of DRAM memory interface signals and the second set of DRAM memory interface signals being mapped to common signal pins coupled to the memory interface bus in accordance with their common respective interface functions.

* * * * *

UNITED STATES PATENT AND TRADEMARK OFFICE
CERTIFICATE OF CORRECTION

PATENT NO.    : 5,893,136
DATED         : April 6, 1999
INVENTOR(S)   : Stolt et al.

It is certified that error appears in the above-identified patent and that said Letters Patent is hereby corrected as shown below:

Column 10,
Line 26, delete "T1" and insert -- T11 --.

Signed and Sealed this

Seventeenth Day of February, 2004

JON W. DUDAS
*Acting Director of the United States Patent and Trademark Office*